United States Patent
Shan

(10) Patent No.: US 12,349,251 B2
(45) Date of Patent: Jul. 1, 2025

(54) CONTROLLED LIGHTING SYSTEM

(71) Applicant: LED Smart Inc., Surrey (CA)

(72) Inventor: Xinxin Shan, Surrey (CA)

(73) Assignee: LED Smart Inc., Surrey (CA)

( * ) Notice: Subject to any disclaimer, the term of this patent is extended or adjusted under 35 U.S.C. 154(b) by 195 days.

(21) Appl. No.: 18/298,513

(22) Filed: Apr. 11, 2023

(65) Prior Publication Data

US 2023/0403773 A1    Dec. 14, 2023

(30) Foreign Application Priority Data

Jun. 10, 2022 (CA) ..................................... 3162554

(51) Int. Cl.
*H05B 45/22* (2020.01)
*A01G 7/04* (2006.01)

(52) U.S. Cl.
CPC ............. *H05B 45/22* (2020.01); *A01G 7/045* (2013.01)

(58) Field of Classification Search
CPC ........ H05B 45/22; H05B 45/46; H05B 47/19; H05B 45/20; A01G 7/045
See application file for complete search history.

(56) References Cited

U.S. PATENT DOCUMENTS

| | | | |
|---|---|---|---|
| 5,956,897 A | 9/1999 | Takashima | |
| 6,725,598 B2 | 4/2004 | Yoneda | |
| 6,921,182 B2 | 7/2005 | Anderson, Jr. et al. | |
| 9,137,878 B2 | 9/2015 | Thompson | |
| 10,649,500 B2 | 5/2020 | Zenoff | |
| 10,863,598 B2 | 12/2020 | Eisele | |
| 2003/0169431 A1* | 9/2003 | Moriuchi | G01J 1/42 356/601 |
| 2007/0157515 A1 | 7/2007 | Bula | |
| 2007/0289207 A1 | 12/2007 | May et al. | |

(Continued)

FOREIGN PATENT DOCUMENTS

| | | |
|---|---|---|
| CA | 2705648 | 11/2010 |
| CA | 2752594 | 12/2018 |
| WO | 2005041633 | 5/2005 |
| WO | 2008068699 | 6/2008 |

OTHER PUBLICATIONS

"CIE 1931 Color Space," Wikipedia, The Free Encyclopedia, <http://en.wikipedia.org/wiki/CIE_1931_color_space> [retrieved Jun. 8, 2022], pp. 1-16.

Nave, R., "The CIE Color System," <www.hyperphysics.phy-astr.gsu.edu/hbase/vision/cie.html> [retrieved Jun. 8, 2022], pp. 1-5.

(Continued)

*Primary Examiner* — Abdullah A Riyami
*Assistant Examiner* — Syed M Kaiser
(74) *Attorney, Agent, or Firm* — CHRISTENSEN O'CONNOR JOHNSON KINDNESS PLLC

(57) ABSTRACT

The combined color of a color tunable and intensity adjustable light source can be quantitatively described using the chromaticity diagram. With a preset color, or dominant wavelength, and daily light interval, the microprocessor in this plant growing system can compare the calculated chromaticity diagram data from the corresponding sensor with this preset color value and fine tune the combined color until these two are matched. The microprocessor then can control the lighting time according to daily light interval setting. The system can then automatically control the color and photon numbers. The same control method and algorithm can be used in general lighting system as well.

15 Claims, 6 Drawing Sheets

(56) References Cited

U.S. PATENT DOCUMENTS

| | | |
|---|---|---|
| 2009/0025287 A1 | 1/2009 | Lee |
| 2009/0031622 A1 | 2/2009 | Emoto |
| 2010/0020536 A1 | 1/2010 | Bafetti et al. |
| 2010/0115830 A1 | 5/2010 | Dube |
| 2010/0289411 A1 | 11/2010 | Smits et al. |
| 2015/0263240 A1* | 9/2015 | Tomizawa ............... G01J 3/10 362/231 |
| 2016/0273717 A1* | 9/2016 | Krames ............... G02B 6/0073 |
| 2018/0160491 A1* | 6/2018 | Biery ................. H05B 45/22 |
| 2021/0193014 A1* | 6/2021 | Schrama ............... H01L 33/32 |
| 2022/0110195 A1* | 4/2022 | Casey ................ H05B 47/155 |

OTHER PUBLICATIONS

Avery, Paul, "Chromaticity Diagrams: Measuring Color 111" <http://www.phys.ufl.edu/avery/course/phy3400_f99/> [retrieved Jun. 8, 2022] pp. 1-8.

Folta, Kevin M., and Kayla Shea Childers, "Light as a Growth Regulator: Controlling Plant Biology With Narrow-Bandwidth Solid-State Lighting Systems," HortScience 43(7); Dec. 2008; pp. 1957-1964.

Philips Article, "Be in Control of Your Profits," Koninklijke Philips Electronics N.V., Sep. 2009, 4 pages.

Yavari, Nafiseh, et al.,"The Effect of Light Quality on Plant Physiology, Photosynthetic, and Stress Response in *Arabidopsis thaliana* Leaves," Research Article, PLOS One, <http://www.doi.org/10.1371/journal.pone.0247380> Mar. 4, 2021, pp. 1-19.

"Standard Illuminant," Wikipedia, The Free Encyclopedia, <https://en.wikipedia.org/wiki/Standard_illuminant> [retrieved Jun. 8, 2022] pp. 1-10.

\* cited by examiner

CONTROLLED LIGHTING SYSTEM

TECHNICAL FIELD

The present invention generally relates to color and intensity control in a horticultural or general lighting system.

BACKGROUND

Lighting is one of the most important elements for plant growing. For horticultural lighting, the most important parameters are combined colors and lighting intensity/lighting time length. The combined colors can be described using a chromaticity diagram so that one can have an intuitive and digital view of the final color. In an example, a CIE1931 chromaticity diagram is used. The accumulated photon numbers per area is called Daily Light Interval (DLI), which equals to the light intensity multiplied by time. DLI can be measured with a photon sensor and then calculated by the lighting control microprocessor.

Lighting is also an important element for people's everyday lives. The combined colors and the intensities of the light can greatly influence the emotions, behaviors, and overall health. Humancentric lighting is a good example. The chromaticity diagram can be used to accurately control combined colors of lights.

SUMMARY

Plants need more blue light at the rooting and germinating stages, more red light at the green growing stage, and even more red but less blue at the flowering and blooming stages. A clear and accurate description of colors at each growing stage is important. This invention uses the chromaticity diagram to quantitatively describe the color of the light and to adjust the lighting source to a preset color. With the help of the photon sensor which measures the photosynthetic photon flux density (PPFD) of the light and then generates the DLI data, an automated horticultural lighting system can be realized.

The chromaticity diagram can also be used to accurately describe the colors of the general lighting applications.

BRIEF DESCRIPTION OF THE FIGURES

Embodiments will now be described with reference to the figures, in which like reference characters denote like elements, by way of example, and in which.

DETAILED DESCRIPTION

Figure 1:
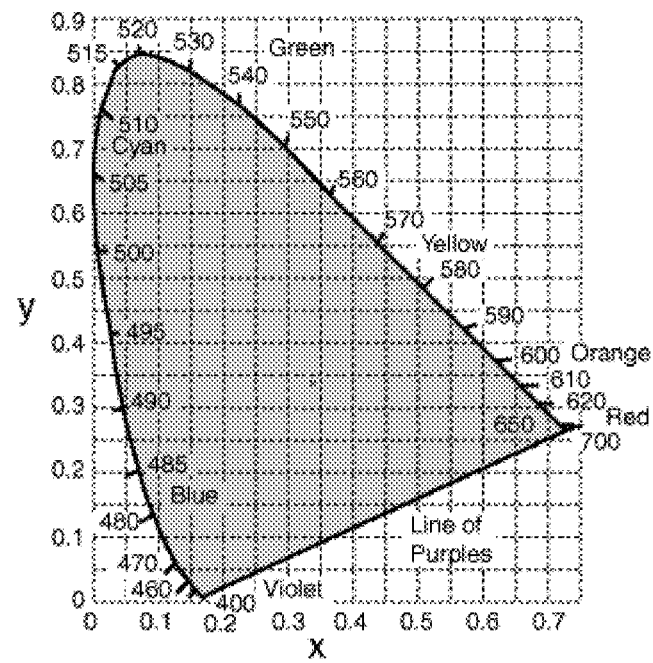
FIG. 1 is a typical CIE1931 chromaticity diagram.

CIE 1931 is a Color Matching System. Color matching in general, and CIE 1931 in particular, describes how colors appear to humans but also tells one how to numerically specify a measured color, and then later accurately reproduce that measured color. See, for example, U.S. Pat. No. 11,348,553 to Su et al., which is hereby incorporated by reference, and U.S. Pat. No. 9,773,471 to Demos, which is hereby incorporated by reference. FIG. 1 shows a CIE 1931 chromaticity diagram. The horseshoe boundary, called the spectrum locus, represents monochromatic light. Any combined color light can be displayed as a spot inside the horseshoe and any monochromatic light can be displayed on the curve of the horseshoe. The 2-dimensional chromaticity coordinates (x, y) of a spot can accurately describe the perceived color of the spot.

Figure 2:
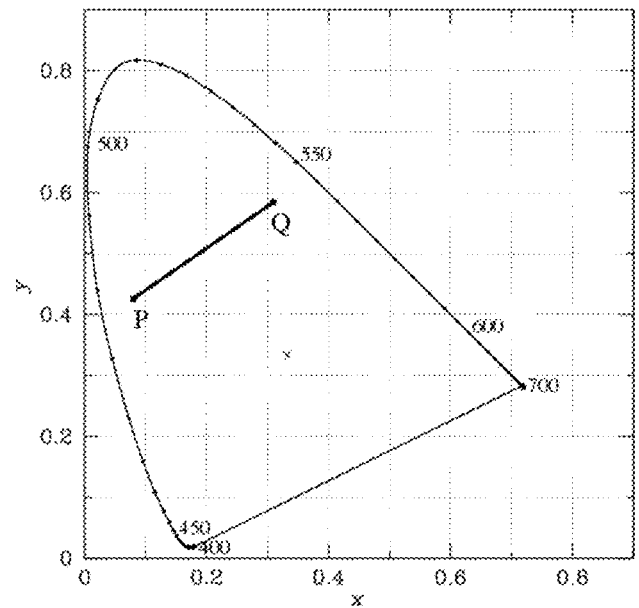
FIG. 2 is a CIE 1931 diagram also showing two colors and the possible colors generated by these two colors.
Figure 3:
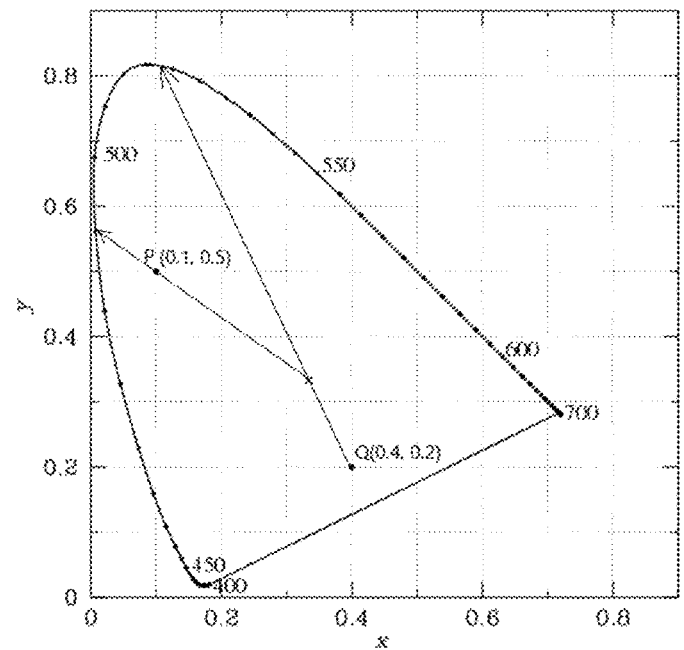
FIG. 3 is a CIE 1931 diagram also showing a method to determine the dominant wavelength of a color.

Two colors in the diagram can generate any color lying between them. FIG. 2 shows two colors at spots P and Q. Different amounts of P and Q generate all colors along the P and Q line.

The spectrum of a standard illuminant, like any other profile of light, can be converted into tristimulus values. The set of three tristimulus coordinates of an illuminant is called a white point. If the profile is normalized, then the white point can equivalently be expressed as a pair of chromaticity coordinates. Dependent on the illuminant, the chromaticity coordinates of the white points are different. It can be equal energy E (⅓, ⅓), or middle morning/middle afternoon daylight D55 (0.3324, 0.3374), or noon daylight D65 (0.3127, 0.3290), or other values in other situations. FIGS. 1, 2, 3 and 4 show a cross sign in the center of the horseshoe representing an example white point. For any point of P, you can draw a line from the white point to the P and then extend to the horseshoe curve. The wavelength of the junction is called the dominant wavelength. If the extension line reaches to the horseshoe curve without wavelength marks, then a complementary wavelength can still be obtained by extending the line to the opposite direction, that is from the color point through the white point to the horseshoe curve. As an example, in FIG. 3, the dominant wavelength of point P (0.1, 0.5) is 495 nm. The complementary wavelength of point Q (0.4, 0.2) is about 518 nm.

Figure 4:
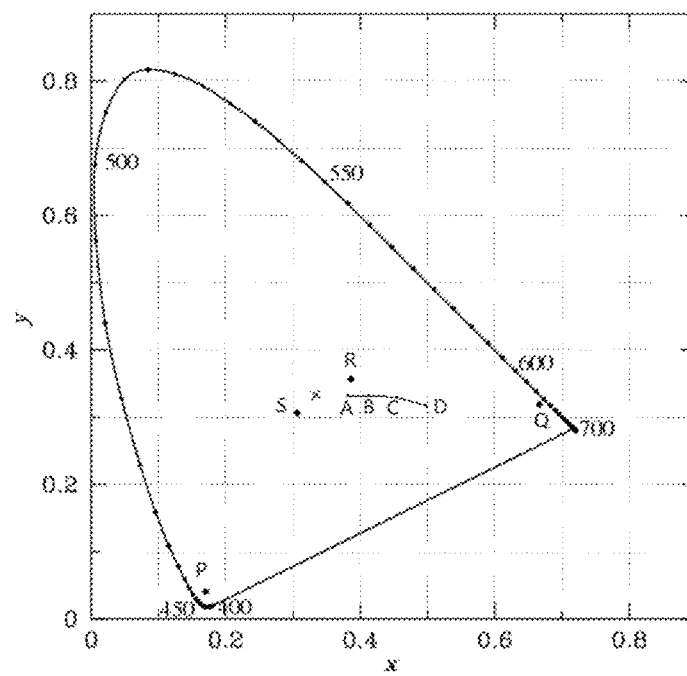
FIG. 4 is a CIE 1931 chromaticity diagram also showing positions of four different LEDs on the diagram and a curve formed by a combination of these LEDs.

Generally, a tunable horticulture lighting source contains at least two-colored LEDs. These colored LEDs generate lights at different dominant wavelengths. The generated red portion to blue portion to green portion ratio is a key parameter to describe the status of the lighting source. Green light has less effect on plants than red and blue. A lighting source may have additional light than red and blue for various reasons. First, the degree to which horticultural light should include green components is still being investigated, and some amount of green light may be useful. Second, white LEDs can be less expensive than single-colored LEDs and include multiple colors useful to plants. Third, additional colors can be included for aesthetic effect. In an example, a horticultural lighting source has a nominal power of 300 W. That is, it consumes 300 W of power at its normal working condition. It may be desired for a practical light to maintain the nominal power regardless of color settings. In this example as further described in relation to FIG. 4, the light includes red LEDs, blue LEDs and two different white LEDs. The full power output if all 4 drivers were set to max may be, for example, about 390 W. In this example, we can adjust the drivers/colors to allow the red to blue ratios to range from 1:1 to 10:1 while keeping the total power at the nominal 300 W. The value of 300 W is just an example and the same series of color ratios could be obtained with different power consumption. As an example, a lighting source containing 4 different colored LEDs with chromaticity coordinates at point P, Q, R and S is shown in FIG. 4. The corresponding chromaticity coordinates with color ratios ranging from 1:1 to 10:1 can be drawn as a curve as shown with points A, B, C and D in FIG. 4. The color ratio curve can be obtained through experiments or theoretically calculated. For example, the red-to-blue ratio obtained by a given set of LED driver settings, and the corresponding chromaticity point, may be obtained using a sphere spectrometer. To obtain a desired red-to-blue ratio, the methods described below may be used to adjust the chromaticity to a value determined by experiment to obtain the desired red-to-blue ratio. The red-to-blue ratio and chromaticity values could also be calculated using models of the LED light output if available. Using multiple types of white lights of different color can make adjustment more easy to cover a wider range of red-to-blue ratios and chromaticity.

If a grower wants a lighting source working at a certain dominant or complementary wavelength, then one can draw a line passing through the wavelength mark on the curve of the horseshoe and the white point. The junction of this line to the above-mentioned color ratio curve is the color and the color ratio that the lighting source should be set to work at.

Figure 5:
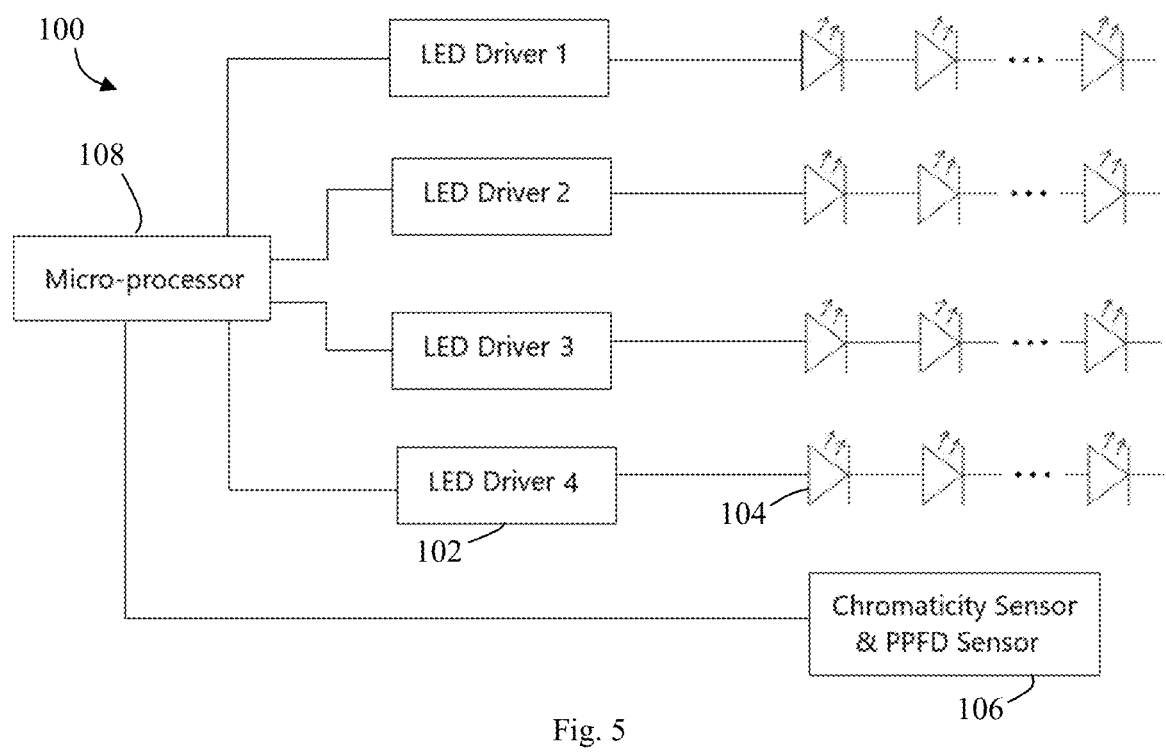
FIG. 5 shows a schematic electronic diagram of a lighting system including four different colored LED lights.
Figure 8:
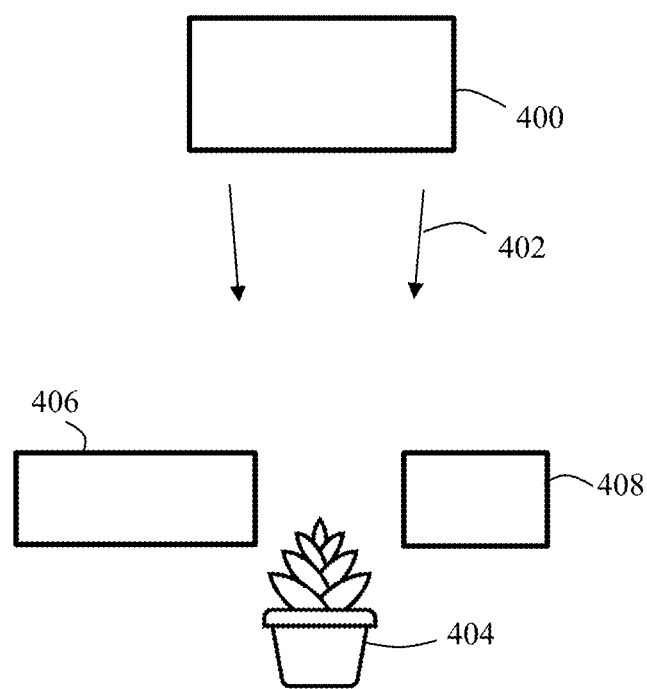
FIG. 8 is a diagram showing a lamp illuminating a plant with a chromaticity sensor and a photosynthetic photon flux density (PPFD) sensor near the plant.

FIG. 5 shows an electronic diagram of a horticultural lighting system 100 as mentioned in relation to FIG. 4. In this system 100, there are 4 LED drivers 102, each LED driver driving a string of single colored or mixed colored LEDs 104. Light sensors 106 detect the light from LEDs 104 in order to determine the quantity and color of light. These sensors 106 may be located, for example, near canopies of plants 404, as shown in FIG. 8, to better measure the light reaching the plants 404. A microprocessor 108 can fetch the chromaticity parameters of the combined light colors from the sensors 106 and adjust the drivers 102 to modify the combined colors.

Figure 6:
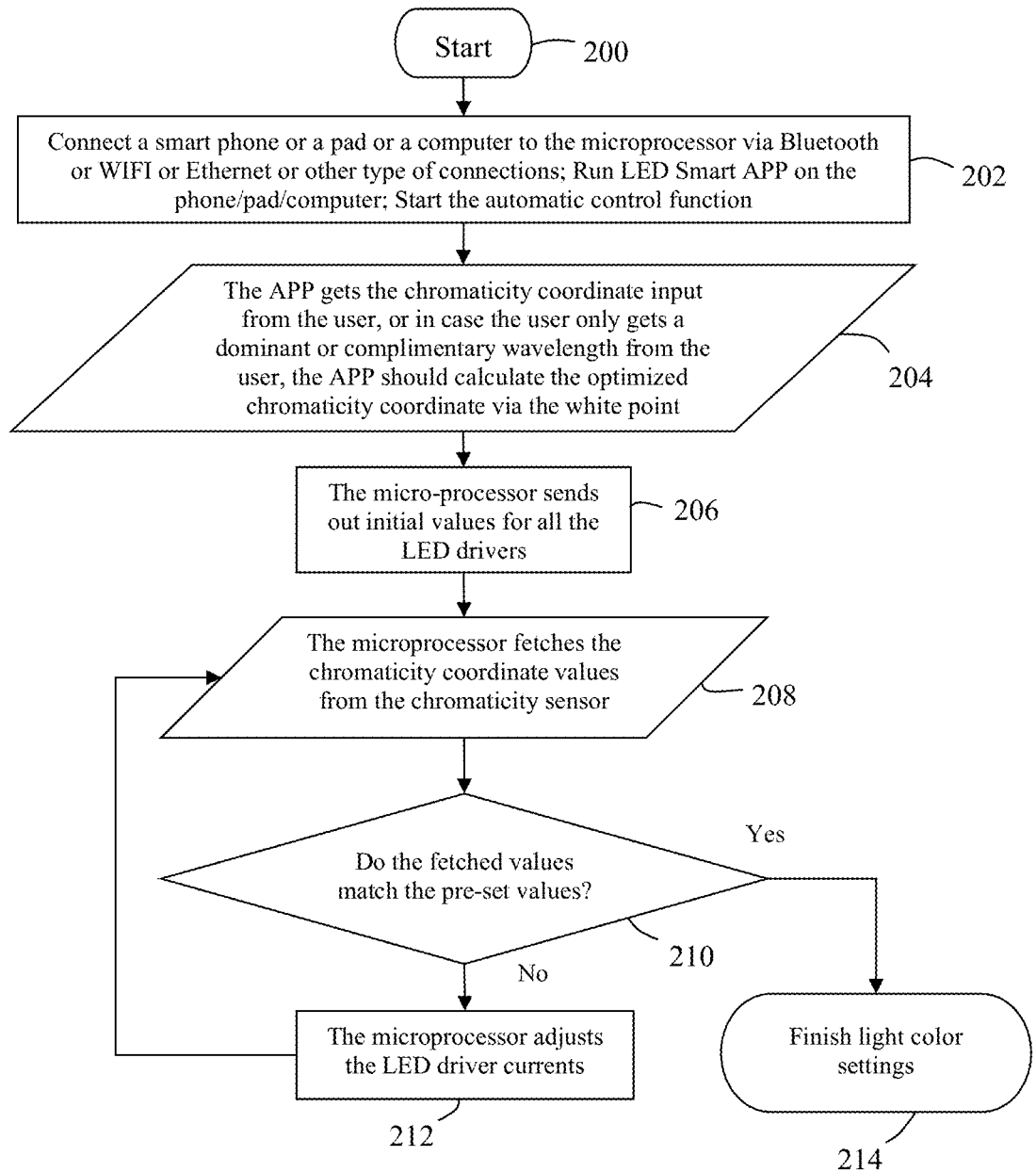
FIG. 6 is a flow chart showing an algorithm to match the color with preset chromaticity coordinates or a dominant wavelength.

An exemplary color control algorithm is shown in FIG. 6. From a start 200, first, in step 202 a user utilizes an APP or other applications via Bluetooth, WIFI, or other connecting methods to connect to the microprocessor. The user then sets-up the desired chromaticity coordinates or dominant or complementary wavelength in step 204. If the user sets a dominant wavelength rather than the chromaticity coordinates, then the microprocessor should calculate the optimized chromaticity coordinates using the above-mentioned method as described in relation to FIG. 4. The microprocessor then outputs initial values to all the drivers in step 206 and obtains the measured chromaticity coordinates from the photon sensor in step 208. The measured values are compared with the pre-set values in step 210. If they are not matched, then the microprocessor adjusts the drivers slightly in step 212 and recalculates until these two values are matched, finishing in step 214.

After setting up the light color, the DLI in the unit of moles per square meters may be controlled. The DLI can be measured by multiplying the photosynthetic photon flux density (PPFD), measured in micro-moles irradiated photons in the PAR range of 400-700 nm per square meter per second, with time in the unit of hours. Considering the unit changing (hours to seconds, moles to micro-moles), the relationship between DLI and the PPFD can be expressed as:

DLI=PPFD×lighting hours per day×(3600/1000,000).

Figure 7:
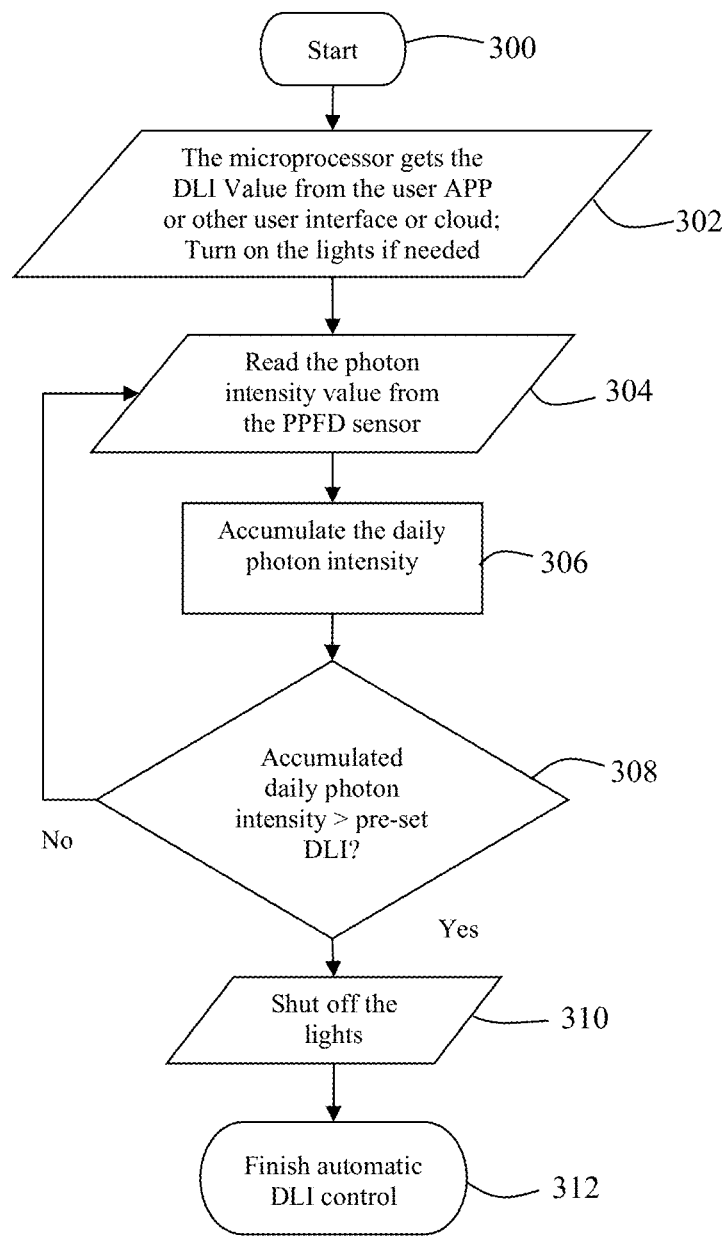
FIG. 7 is a flow chart showing an algorithm to automatically control the light after color match.

FIG. 7 shows an exemplary algorithm to control the DLI value of a horticultural lighting system. From a start 300, the DLI value can be set by a user or through a cloud server to the microprocessor in step 302, and if needed turns on the lights, for example using color settings obtained using a chromaticity diagram as described in relation to FIG. 6. In step 304 the microprocessor obtains the measured PPFD values from a PPFD sensor in a certain time interval. The microprocessor accumulates the DLI in step 306 by multiplying the measured PPFD value with the time interval. When the accumulated DLI reaches to the pre-set value as determined in step 308, the microprocessor then switches off the lighting source for the day in step 310, finishing in step 312. The length of the time interval is adjustable; one may choose to set a period of 24 hours or any other desirable time interval.

FIG. 8 is a schematic drawing, not to scale, showing a lamp 400 emitting light 402 which shines on a plant 404, a chromaticity sensor 406 and a PPFD sensor 408. The chromaticity sensor 406 and the PPFD sensor 408 are shown near the plant 404 to best measure the light reaching the plant. The chromaticity sensor 406 and PPFD sensor 408 are shown here as separate units but could be combined into a single unit. The chromaticity sensor could be located other than near the plant 404 in the event that light other than near the plant can be expected to be of the same color as the light near the plant (for example where the lamp 400, or the lamp 400 and other commonly controlled lamps of the same color, are the only light source).

Although this embodiment only mentions one lighting source, the embodiment is also applied to more than one lighting source working together or in different groups, or individually. Where the sensors are near a plant, the methods shown may be used to adjust the controlled lights to compensate for the presence of other lights, including for example the sun, which are not controlled according to these methods.

The same color description using the chromaticity diagram can also be applied to a general lighting system. A user can preset the chromaticity coordinates for a general lighting source. The microprocessor-based control system initializes the LED drivers. The microprocessor then fetches the chromaticity coordinates from the sensors and performs the necessary adjustment until the measured chromaticity coordinates match the preset values. If the user presets a dominant wavelength rather the chromaticity coordinates, the microprocessor should be able to calculate a pair of optimized chromaticity coordinates as the preset values automatically.

For the general lighting source, the accumulated lighting energy is generally not important. However, the lighting intensities must be in a range that makes most people feel comfortable.

The same control algorithms are also suitable for the controlling of at least one more general lighting source.

CIE 1931 chromaticity diagram is a 2-D diagram from a 3-D color space. The invention is also suitable for the 3-D color space.

CIE 1976 chromaticity diagram provides a more uniform color space than CIE 1931 chromaticity. The descriptions, calculations and algorithms using CIE 1931 may be replaced with other chromaticity diagrams, including for example the CIE1976 chromaticity diagram.

The pre-set chromaticity coordinates can be calculated from a known optical spectrum. The red-to-blue ratio can also be calculated from a known optical spectrum.

The embodiments of the invention in which an exclusive property or privilege is claimed are defined as follows:

1. A color tunable lighting system, comprising:
   a processor;
   one or more LED drivers, each of the one or more LED drivers driving one or more respective LEDs and connected to the processor to be controlled by the processor, the respective LEDs including at least two or more LEDs of different colors;
   a chromaticity sensor connected to the processor to send chromaticity information from the processor;
   the processor being connected to a non-transitory memory containing software instructions to cause the processor to control the one or more LED drivers according to the chromaticity information to adjust the at least two or more LEDs of different colors to cause the chromaticity information to approach a preset chromaticity, in which the preset chromaticity is calculated from user input representing a dominant or complementary wavelength using a chromaticity space; and
   in which the preset chromaticity is calculated from the user input representing the dominant or complementary wavelength according to the steps of:
   determining a curve in the chromaticity space obtainable by different ratios of brightness of the two or more LEDs of different colors;
   determining a point in the chromaticity space corresponding to the selected dominant or complementary wavelength;
   determining a line in the chromaticity space intersecting the point corresponding to the dominant or complementary wavelength and a white point; and
   determining an intersection between the line in the chromaticity space and the curve in the chromaticity space to obtain the preset chromaticity.

2. The color tunable lighting system of claim 1 in which the color chromaticity space is a chromaticity diagram.

3. The color tunable lighting system of claim 2 in which the chromaticity diagram is a CIE1931 chromaticity diagram.

4. The color tunable lighting system of claim 2 in which the chromaticity diagram is a CIE1976 chromaticity diagram.

5. The color tunable lighting system of claim 1, including lighting sources of different models.

6. The color tunable lighting system of claim 1 being a horticultural lighting system.

7. A method of adjusting a horticultural lighting system including two or more LEDs of different colors to have a selected dominant or complementary wavelength, the method comprising the steps of:
   determining a curve in a chromaticity space obtainable by different ratios of brightness of the two or more LEDs of different colors;
   determining a point in the chromaticity space corresponding to the selected dominant or complementary wavelength;
   determining a line in the chromaticity space intersecting the point corresponding to the dominant or complementary wavelength and a white point;
   determining an intersection between the line in the chromaticity space and the curve in the chromaticity space to obtain a specific point in the chromaticity space;
   measuring a light output of the horticultural lighting system to compare a measured chromaticity of the light output to the specific point in the chromaticity space;
   adjusting the brightness of the two or more LEDs to adjust the light output towards the specific point in the chromaticity space;
   measuring a brightness of the light output of the horticultural lighting system over time, accumulating the measurements to obtain a Daily Light Interval (DLI); and
   on the DLI reaching a threshold, turning off the two or more LEDs of the horticultural lighting system.

8. The color tunable lighting system of claim 1
   in which the non-transitory memory also contains software instructions to cause the processor to carry out the steps of:
   measuring a brightness of the light output of the horticultural lighting system over time, accumulating the measurements to obtain a Daily Light Interval (DLI); and
   on the DLI reaching a threshold, turning off the two or more LEDs of the horticultural lighting system.

9. A color tunable lighting system, comprising:
   a processor;
   one or more LED drivers, each of the one or more LED drivers driving one or more respective LEDs and connected to the processor to be controlled by the processor, the respective LEDs including at least two or more LEDs of different colors; and
   a chromaticity sensor connected to the processor to send chromaticity information from the processor;
   the processor being connected to a non-transitory memory containing software instructions to cause the processor to control the one or more LED drivers according to the chromaticity information to adjust the at least two or more LEDs of different colors to cause the chromaticity information to approach a preset chromaticity, in which the preset chromaticity is calculated from user input representing a desired red-to-blue ratio using a color space; and
   in which the preset chromaticity is calculated from the user input representing the desired red-to-blue ratio according to the steps of:
   determining a curve in the color space obtainable by different ratios of brightness of the two or more LEDs of different colors with substantially constant total brightness;
   determining a point on the curve determined by experiment or by calculation to correspond to the desired red-to-blue ratio; and
   obtaining the preset chromaticity from the determined point on the curve.

10. The color tunable lighting system of claim 9 in which the color space is a chromaticity diagram.

11. The color tunable lighting system of claim 10 in which the chromaticity diagram is a CIE1931 chromaticity diagram.

12. The color tunable lighting system of claim 10 in which the chromaticity diagram is a CIE1976 chromaticity diagram.

13. The color tunable lighting system of claim 9 in which the non-transitory memory also contains software instructions to cause the processor to carry out the steps of:
   measuring a brightness of the light output of the horticultural lighting system over time, accumulating the measurements to obtain a Daily Light Interval (DLI); and
   on the DLI reaching a threshold, turning off the two or more LEDs of the horticultural lighting system.

14. The color tunable lighting system of claim 9, including lighting sources of different models.

15. The color tunable lighting system of claim 9 being a horticultural lighting system.

* * * * *